3,487,028
MODIFIED CHARCOAL-CYANIDE CATALYST FOR ACRYLONITRILE PRODUCTION

Clifford E. Smith, Bartlesville, Okla., assignor to Phillips Petroleum Company, a corporation of Delaware
No Drawing. Filed Apr. 18, 1967, Ser. No. 631,622
Int. Cl. B01j 11/82
U.S. Cl. 252—438     5 Claims

ABSTRACT OF THE DISCLOSURE

A catalyst and process for conversion of hydrogen cyanide and acetylene to acrylonitrile, the reactants being contacted with a catalyst prepared by extracting a charcoal with an alkaline solution, then substantially reducing or eliminating alkalinity or alkali or other mineral matter from the thus treated charcoal and then treating the charcoal with an alkali metal cyanide or a compound convertible to the cyanide. A number of examples are given.

---

This invention relates to the production of acrylonitrile. It also relates to a novel catalyst for the production of acrylonitrile. More specifically, the invention relates to the production of acrylonitrile from acetylene and hydrogen cyanide employing a catalyst comprising a charcoal and a cyanide.

In one concept of the invention it provides a catalyst for the production of acrylonitrile comprising a charcoal which has been treated with an alkaline solution and subsequently extracted to reduce or eliminate alkalinity by removal of alkali and other mineral matter, the thus treated charcoal being then treated with a suitable alkali metal cyanide, e.g., an composition containing NaCN-KCN. In another concept the invention provides a process for the preparation of a catalyst, suitable for the conversion of acetylene and hydrogen cyanide into acrylonitrile, which comprises extracting charcoal or the like with an alkaline solution such as aqueous sodium hydroxide, then extracting the thus treated charcoal as with a suitable agent, for example, with a suitable acid solution such as aqueous acetic acid, in a now preferred embodiment washing with water, and then treating the thus treated charcoal with a suitable alkali metal cyanide containing material or a material which can be converted to cyanide. In a further concept the invention provides a process for converting acetylene and hydrogen cyanide to acrylonitrile by contacting these materials with a catalyst prepared as related herein.

It has been known for some time to prepare acrylonitrile from acetaylene and hydrogen cyanide. In U.S. Patent 2,805,244, Sept. 3, 1957, unactivated softwood charcoal is heated at 700° C. in a stream of hydrogen for about 24 hours. Water and oxygenated products formed during the conditioning were removed, together with volatile organic compounds. The thus deoxygenated charcoal was impregnated with aqueous solution containing sodium hydroxide to provide, after drying, sodium hydroxide in the charcoal. Upon completion of the sodium hydroxide impregnation the catalyst was heated at a temperature of the order of about 550° C. in a stream of hydrogen cyanide until recovery of hydrogen cyanide in the off-gases rose to over 80 percent. An acetylene containing stream, deoxygenated, was passed together with hydrogen cyanide over the thus treated catalyst at a temperature of about 550° C. to about 600° C., the mole ratio of acetylene to hydrogen cyanide being about 1.2:1. A 64.5% conversion of hydrogen cyanide to acrylonitrile, average for a 42 hour run is reported in the patent. The average yield of acrylonitrile, based on hydrogen cyanide, is reported as 85.5%. U.S. Patent 2,413,623, Dec. 31, 1946, also relates to the use of a charcoal impregnated with sodium cyanide to convert hydrocyanic acid and acetylene to vinyl cyanide, referring to German Patent 559,734, Sept. 23, 1932. Other patents also related to this field are 2,762,834, Sept. 11, 1956, 2,780,640, Feb. 5, 1957, and 2,854,473 Sept. 30, 1958.

I have now found that catalysts superior to those of the prior art can be prepared by extracting charcoal with an alkaline solution such as sodium hydroxide and then extracting the thus treated charcoal with a suitable agent such as a suitable acid solution, for example, aqueous acetic acid. Preferably the charcoal is then washed with water and then treated with a suitable alkali metal cyanide containing composition such as NaCN-KCN or an alkali metal compound converstible to the cyanide.

It is an object of this invention to provide a catalyst for the conversion of HCN and acetylene to acrylonitrile. It is a further object of this invention to provide an improved process for the conversion of HCN and acetylene to acrylonitrile. It is a still further object of the invention to provide an improved catalyst suitable for converting HCN and acetylene into acrylonitrile.

Other concepts, objects, and the several advantages of the invention are apparent from a study of this disclosure and the appended claims.

According to the present invention there is provided a superior catalyst for the production of acrylonitrile from hydrogen cyanide and acetylene by extracting charcoal with alkali solution, then extracting with a suitable agent such as an acid solution, and then treating with a suitable alkali metal cyanide containing composition, for example NaCN-KCN, or an alkali metal compound convertible to the cyanide. Preferably after the extraction the charcoal is washed with water or an equivalent medium.

Also according to the present invention there is provided a process of considerably improved selectivity for the conversion of HCN and acetylene to acrylonitrile, the process comprising the use of a catalyst as herein described.

Charcoal suitable for employment in this invention can be any conventional unactivated charcoal. Ordinary wood charcoal of the kind normally used for outdoor cooking is particularly suitable because of its low price and availability. Such charcoal can be readily converted to suitable particle size and physical form for efficient treatment and catalytic activity, as is well known to the art. Other charcoals now known and used in this art can be used. The examples illustrate charcoals which can and have been used.

The charcoal is first extracted with a suitable alkaline solution. This can be done by any method known to the art. For instance, the charcoal can be soaked in alkaline solution and drained, alkaline solution can be passed through a bed of charcoal, or any other conventional technique can be employed. Repeated extractions and subsequent washes with solvents such as water can be effected, if desired. Alkaline solutions suitable for such extractive treatments can include any aqueous solution containing sufficient alkali of suitable kind to extract substantial quantities of silicates from the charcoal. Preferred are solutions of NaOH because of availability and low cost.

After extraction with alkaline solution, the charcoal, according to the invention, is extracted to remove a substantial quantity (at least about 20%) of the alkaline elements present by suitable agent such as a suitable acid solution, and is preferably subsequently washed with water. Extraction with acid solution followed by washing with water are the presently preferred steps of removing the said quantity of alkaline material. Of course, other ways of effecting the extraction of alkaline materials can be employed such as extensive washing with water, preferably heated water. Such treatments can be effected in any conventional manner. While it is believed that the beneficial effects of such removal of alkaline material are due to the removal of additional silicate impurities such as soluble alkaline silicates without concurrently producing a so-called "activated" charcoal of high nitrogen surface area, we do not wish to be bound by such theory. Suitable acid solutions are those aqueous solutions of acids which substantially neutralize the alkali extracted charcoal and do not introduce substances to the charcoal that are deleterious to the desired catalytic activity. Various acids can be used. These acids should be non-oxidizing and must promote extraction of alkaline material. Examples of such acids include acetic acid, oxalic acid, citric acid, lactic acid, formic acid, hydrochloric acid, phosphoric acid, succinic acid, hydrobromic acid, propionic acid, and the like. Of course, repeated extractions with water or acid solutions can be effected, if desired. Preferably, the material is washed with water as a final step of such procedure prior to treatment with the alkali metal containing composition such as NaCN-KCN.

The water used in the carrying out of the present invention will be selected in light of the effect desired. The water should not introduce undesired elements into the catalyst-to-be. Distilled or deionized water was used in the runs of the examples. However, usually any potable water will be acceptable.

Generally, the ranges of conditions of operation evident from the prior art are operable to effect the processes of the invention.

After extraction of the alkaline elements as above, preferably with acid and water, the charcoal can be treated with any suitable alkali metal containing composition. This can be effected by methods known to the art. Such suitable alkali metal containing compositions can include the hydroxides, cyanides, or carbonates of such alkali metals as sodium, potassium, and the like. If alkali metal cyanides are not employed, the alkali metal compounds employed are such that they are readily converted to cyanides upon contact with HCN. A particularly preferred alkali metal containing composition is a mixture of KCN and NaCN. Such a composition can be readily applied to the charcoal by soaking the charcoal in an aqueous solution thereof or by other methods known to the art.

The catalyst compositions of this invention are employed to convert HCN and acetylene to acrylonitrile by any method known to the art that employs an alkali containing charcoal catalyst. For instance, fluidized bed, column, and other such techniques can be employed. Temperatures, pressures, times of contact, recycles, and the like suitable for other alkali containing charcoal catalysts of the prior art can be employed.

The value and implementation of this invention are clearly demonstrated by the following examples.

EXAMPLE 1

Five catalysts were prepared as follows:

Catalyst A.—A conventional catalyst was prepared by soaking "Chief Chetopah" charcoal (a common cook-out charcoal in briquet form from hardwoods such as oak, maple, and the like), that had previously been ground and sieved to 100–325 mesh size, in an aqueous solution of NaCN and KCN (equal weight amounts) of such strength and for such time as to impart a 17.5% loading of cyanide salts on the charcoal (total wt. of NaCN+KCN (100)/wt. of cyanide salts+charcoal) and drying.

Catalyst B.—Another conventional catalyst was prepared. "Chief Chetopah" charcoal, as above, was soaked in hot (90–100° C.) 10% (wt.) NaOH solution for 4 hours, washed with water (distilled water was used in all cases), dried, sieved to 100–325 mesh and soaked in an aqueous solution of NaCN and KCN (equal weight amounts) of such concentration and for such time as to impart a 17.5% loading of cyanide salts on charcoal based as above.

Catalyst C.—A novel catalyst of this invention was prepared. "Chief Chetopah" charcoal, as above, was soaked in hot NaOH solution as above, washed with water, soaked in hot (90–100° C.) 10% (wt.) oxalic acid solution for 2 hours, washed with water, dried, sieved to 100–325 mesh, and treated to impart 17.5% NaCN-KCN as above.

Catalyst D.—Another novel catalyst of this invention was prepared. "Chief Chetopah" charcoal, as above, was soaked for 7 hours in hot (90–100° C.) 16% (wt.) aqueous NaOH solution and drained, soaked and drained as before again, soaked and drained as before a third time, washed with water, slurried in water, neutralized to a stable pH of 7 with acetic acid, drained, washed with water, dried, sieved to 100–325 mesh, and treated to impart 17.5% NaCN-KCN, as above.

Catalyst E.—Another novel catalyst of this invention was prepared. "Chief Chetopah" charcoal was handled in the same manner as in the preparation of Catalyst D to the point after sieving. The sieved preparation was then soaked in hot (90–100° C.) 20% (wt.) oxalic acid solution for 5 hours, drained, washed with water, dried, and treated to impart 17.5% NaCN-KCN, as above.

Acid treatment was demonstrated to effect the desired extraction of alkali from the charcoal catalyst supports of this invention by determining the total ash contents of catalyst supports B and C just prior to treatment with cyanide salts, as can be seen from the following data:

|   | Percent ash by weight |
|---|---|
| Catalyst support B (NaOH extraction only, prior art method) | 18.5 |
| Catalyst support C (NaOH extraction+acid extraction, according to this invention) | 7.7 |

One cc. of each of the above catalysts was charged to an 8 mm. diameter, quartz, upflow, fixed bed reactor in each of 5 runs. To the reactor of each run was then charged a feed comprised of 10% (vol.) HCN, 10% $C_2H_2$, and 80% $H_2$. Reactor temperature was maintained at 1050° F. and atmospheric pressure was employed. The product streams were analyzed at 0.5, 1.0, 5, 2.5, 3.5, and 4 hours after initiation of each run. The following table presents data obtained.

| Catalyst | At 0.5 hrs. | | 4 hr. average | |
|---|---|---|---|---|
|  | $K_p \times 10^5$ (1) | Selectivity (2) | $K_p \times 10^5$ | Selectivity |
| A | 8.05 | 62.2 | 6.92 | 75.2 |
| B | 5.73 | 73.2 | 5.54 | 76.8 |
| C | 4.88 | 77.5 | 5.44 | 82.8 |
| D | 4.63 | 77.5 | 5.22 | 82.2 |
| E | 9.05 | 87.8 | 7.87 | 81.7 |

This example clearly demonstrates that the acid treated catalysts of this invention effect considerably better selectivities than prior art catalysts that are prepared by treating charcoal with NaCN-KCN either per se or subsequent to simple extraction with alkaline solutions.

Selectivity is the important criterion of catalyst value in a reaction such as the conversion of HCN and acetylene to acrylonitrile as long as reaction rates (or conversions) effected by the catalysts being compared are not greatly different. This is true because, as is known to the art, the unreacted feed materials can be rather cheaply recycled whereas the relatively expensive HCN and $C_2H_2$ cannot be practically recovered when lost as by-products.

In the light of the above, then, this example clearly demonstrates that the novel acid treated catalysts of this invention are superior to conventional catalysts.

(1) $K_p$=moles acetylene reacted/cc. catalyst/sec./ atmosphere of driving force (2) Selectivity=moles of acrylonitrile recovered (100) /moles of acetylene reacted

EXAMPLE 2

Another catalyst of this invention, Catalyst F, was prepared as was Catalyst E above except that a 10% NaCN-KCN loading was effected instead of 17.5% as above. In analogous manner, Catalyst G, a conventional catalyst, was prepared as was Catalyst A except that Catalyst G was given a loading of 10% NaCN-KCN rather than 17.5% as was Catalyst A.

Catalyst F and Catalyst G were evaluated in the same way under the same conditions as were the catalysts of Example 1. The following table presents the results obtained:

| Catalyst | At 0.5 hrs. | | 4 hr. average | |
|---|---|---|---|---|
| | $Kp \times 10^5$ | Selectivity | $Kp \times 10^5$ | Selectivity |
| F | 4.94 | 77.5 | 4.44 | 84.8 |
| G | 6.4 | 66 | 5.51 | 75.8 |

This example further demonstrates the superiority of the acid treated catalysts of this invention, and demonstrates variation which can be practiced in the amount of alkaline material imparted to the catalytic composition.

EXAMPLE 3

Catalyst H, another catalyst of this invention, was prepared by the method used to prepare Catalyst E except that Catalyst H contained 30% NaCN-KCN instead of 17.5% NaCN-KCN. In like manner, Catalyst I, a prior art catalyst, was prepared as was Catalyst A except that Catalyst I contained 30% rather than 17.5%

NaCN-KCN

The catalysts of this example, Catalyst H and Catalyst I, were run as in Example 1 under like conditions. Results of these runs are presented as follows:

| Catalyst | At 0.5 hrs. | | 4 hr. average | |
|---|---|---|---|---|
| | $Kp \times 10^5$ | Selectivity | $Kp \times 10^5$ | Selectivity |
| H | 4.36 | 77.5 | 3.57 | 81.9 |
| I | 9.6 | 58 | 7.34 | 67.8 |

This example further demonstrates the breadth of this invention in that the amount of alkali metal cyanides is not critical.

Reasonable variation and modification are possible within the scope of the foregoing disclosure of the invention, the essence of which is that there have been provided an improved catalyst for the conversion of HCN and acetylene to acrylonitrile, the catalyst being prepared employing both an alkaline treatment and subsequent extraction to reduce or eliminate alkalinity or alkaline or other mineral matter or elements, in a now preferred embodiment reducing said alkalinity with water and in another with a suitable non-oxidizing acid or both, and that a process for converting HCN and acetylene to acrylonitrile employing said catalyst also as described.

I claim:
1. A catalyst suitable for the conversion of HCN and acetylene to acrylonitrile which consists essentially of an alkali metal cyanide and a charcoal, said catalyst being prepared by extracting a suitable charcoal with an alkaline solution and then substantially reducing or eliminating alkalinity or alkali or other mineral matter from the thus treated charcoal and then treating the twice treated charcoal with a suitable alkali metal cyanide containing composition or an alkali metal compound convertible to the cyanide.

2. A catalyst according to claim 1 wherein ordinary wood charcoal of the kind normally used for outdoor cooking is first extracted with a suitable alkaline solution and then extracted with at least one of water and a suitable acid solution, washed with water and then treated with a composition to supply ultimately a suitable alkali metal cyanide to render the catalyst effective for the conversion of hydrogen cyanide and acetylene to acrylonitrile.

3. A catalyst according to claim 1 wherein a hardwood charcoal is ground, soaked in hot alkaline solution for a number of hours, is then washed with suitable water and then soaked in at least one of hot water and a hot acid for a number of hours, again washed with water and then treated to contain an alkali metal cyanide.

4. A catalyst according to claim 1 wherein a conventional unactivated charcoal is soaked in an alkali metal hydroxide solution for a number of hours is then washed and then soaked in at least one of water and an organic acid solution for a number of hours is then dried and treated to contain NaCN-KCN.

5. A catalyst according to claim 1 wherein a charcoal suitable for use in the preparation of a catalyst for use in the conversion of HCN and acetylene to acrylonitrile is first soaked in hot alkaline solution then washed in water then soaked in at least one of a hot water and a hot acid solution then washed with water and then treated to contain an alkali metal cyanide.

References Cited

UNITED STATES PATENTS

| 2,177,473 | 10/1939 | Brant | 252—444 XR |
| 2,413,623 | 12/1946 | Harris | 260—465.3 |
| 2,847,447 | 8/1958 | Steadman et al. | 252—438 XR |
| 2,854,473 | 9/1958 | Spaulding et al. | 260—465.3 |

PATRICK P. GARVIN, Primary Examiner

U.S. Cl. X.R.

252—444; 260—465.3

UNITED STATES PATENT OFFICE

CERTIFICATE OF CORRECTION

Patent No. 3,487,028                        Dated: December 30, 1

It is certified that error appears in the above-identified patent and that Letters Patent are hereby corrected as shown below:

Claim 1, line 5, Col. 6, line 9, "substantially reducing or eliminating should be deleted and --- removing at least about 20% of the - should be inserted.

SIGNED AND
SEALED
JUN 16 1970

(SEAL)
Attest:

Edward M. Fletcher, Jr.
Attesting Officer

WILLIAM E. SCHUYLER,
Commissioner of Paten